Patented May 17, 1927.

1,629,074

UNITED STATES PATENT OFFICE.

CASIMIR FUNK AND HARRY E. DUBIN, OF NEW YORK, N. Y., ASSIGNORS, BY MESNE ASSIGNMENTS, TO H. A. METZ LABORATORIES, INC., OF NEW YORK, N. Y., A CORPORATION OF NEW YORK.

METHOD OF OBTAINING FROM COD-LIVER OIL A HIGHLY-CONCENTRATED SUBSTANCE RICH IN ANTIRACHITIC AND ANTIXEROPHILIC VITAMINES AND THE PRODUCT THEREOF.

No Drawing.    Application filed June 28, 1923. Serial No. 648,390.

This invention relates to the treatment of cod liver, cod liver oil or its derivatives for the purpose of obtaining therefrom a highly concentrated substance rich in the antixerophthalmic and antirachitic vitamines, to which, as has been definitely established, cod liver oil owes its therapeutic action.

We have found that the vitamine content of cod liver oil, for example, can be rendered completely separable from the bulk of the oil by the use of glacial acetic acid. Of all the solvents tried, including organic acids such as formic, acetic, etc., ether, ligroin, benzol, chloroform, acetone, alcohol, xylol, ethyl acetate, carbon tetrachloride, etc., glacial acetic acid gives the best results. Only when an organic acid such as glacial acetic acid is used to extract cod liver oil does the extracted residual oil lose its therapeutic activity, thus showing that the vitamines present originally are completely removed by the glacial acetic acid.

The process hereinafter illustrated by a disclosure of a specific procedure which may be employed for the treatment of cod liver oil is of general application for the isolation of a highly concentrated substance, very rich in antirachitic and antixerophthalmic vitamines, from vitamine-bearing livers, tissues, fats and oils, the procedure varying slightly with the nature of the vitamine-bearing material used.

The process comprises in general two operations or parts, (1) the extraction of the oil with an organic acid such as glacial acetic acid; and (2) the separation of the vitamine concentrate from the glacial acetic acid extract.

The exact chemical identification of the active principle or principles or vitamines is not possible by means of present known methods. However, it is proven that the vitamine concentrate contains antixerophthalmic and antirachitic vitamines by the fact that it promotes the growth of rats, cures and prevents xerophthalmia, and cures and prevents rickets. The action of the vitamine concentrate has been tested out successfully on rats, the results being as satisfactory as those obtained with fresh cod liver oil. Experiments with children, exhibiting a condition which would ordinarily call for the administration of cod liver oil, have thus far yielded favorable results, a distinct improvement being apparent.

*Example.*—1000 gms. cod liver oil are heated with 1000 gms. glacial acetic acid under reflux for 8 hours. The extracted oil is separated from the acetic acid extract and discarded. The acetic acid extract is concentrated to about one third the original volume, when some oil separates out. This oil is discarded and the evaporation is continued until the residue amounts to about 100 cc. The residue is taken up in benzol and the benzol solution is washed with water until the washings no longer react acid. The benzol is then evaporated off and the oily residue saponified with 250 cc. of 20% alcoholic KOH or NaOH for 1 hour under reflux. Saponification in watery KOH or NaOH may be used instead. After cooling, 650 cc. water are added and the whole is shaken out several times with benzol. Other solvents such as ether, toluol, chloroform, etc., may be used instead of benzol. The combined benzol extracts are evaporated until all of the benzol is driven off.

There is now left about 0.6 gm. of a dark brown oily substance with a faint aromatic odor. On standing, this oil crystallizes in light yellow needles, radiating from a central point. This highly concentrated substance which is insoluble in water but soluble in chloroform and other organic solvents contains almost all of the antixerophthalmic and antirachitic vitamines originally present in the fresh cod liver oil. In other words, if this 0.6 gm. vitamine concentrate is incorporated in 1000 gms. cottonseed oil, the resultant product will be an oil practically equivalent in vitamine activity to the original cod liver oil. It should be borne in mind that cottonseed oil of itself contains no vitamines.

The highly concentrated vitamine product obtained as described above may be still further purified and concentrated by means of the digitonin or other saponin precipitation in the usual manner. Thus, from 0.6 gm. of the vitamine concentrate the digitonin precipitation removes 0.4 gm. of impurities, leaving 0.2 gm. of vitamine concentrate which crystallizes in needles, is insoluble in water but freely soluble in chloroform, ether and other organic solvents, and contains practically all of the antirachitic and antixerophthalmic vitamines present in the original 1000 gms. cod liver oil. This means that the vitamine content of 1000 gms. cod liver oil has been concentrated into an amount of substance weighing about .0002 of the original oil. By working with extreme care a concentration of from 10,000 to 15,000 is readily obtained.

It has thus far not been possible to establish the exact chemical composition of this highly concentrated vitamine substance, excepting that the presence of C, H, O, and S have been demonstrated. N and P are absent, as are also the halogens. The $H_2SO_4$ reaction still takes place as with fresh cod liver oil, showing that the vitamine activity of the concentrate has not been lost during the process of concentration.

The saponification step employed is not in itself a new procedure. It is used simply to get rid of saponifiable material, the vitamines of the cod liver oil being non-saponifiable.

The digitonin precipitation also is not new in itself, having been used by us for a similar purpose, as illustrated in our application, Serial No. 560,765, filed May 13, 1922.

However, the use of an organic acid such as glacial acetic acid is novel and is an important improvement. The glacial acetic acid treatment presumably brings about a hydrolysis of the vitamine fraction of the oil, thereby facilitating its liberation from the remaining oil and its subsequent solution in the acetic acid. The glacial acetic acid extraction also appears to effect a complete separation of the vitamine fraction from the remaining oil, so that the extracted oil is totally inactive. The extraction with glacial acetic acid also reduces the quantity of oil to be saponified. Thus, in the foregoing example the vitamines in 1000 gms. of cod liver oil are concentrated by the glacial acetic acid extraction into about 100 gms. of material. It is also noted that there is only about 1000 cc. liquid resulting from the saponification to be extracted with benzol, whereas if 1000 gms. of cod liver oil were saponified there would be 10,000 cc. liquid to be extracted with benzol. Thus the glacial acetic acid extraction not only reduces the bulk of material to be handled but it also makes possible a higher concentration of the vitamines than is possible if the glacial acetic acid extraction is omitted.

The vitamine concentrate, obtained as described above, has been proven to be of great value in cases indicating a lack or insufficient supply of antixerophthalmic and antirachitic vitamines.

Heretofore cod liver oil has been used empirically in the treatment of malnutrition and rickets with great success. It is only in recent years that science has proven that the therapeutic action of cod liver oil is due to its vitamine content. The trend of science is always to try to concentrate, as far as possible, the active principle of a substance and to discard the inactive moiety, which may be regarded as impurities. Our procedure, herein described, produces the desired result, i. e. a highly concentrated substance very rich in antirachitic and antixerophthalmic vitamine, free from most of the inactive impurities and from the objectionable features of cod liver oil.

To sum up, the procedure herein described has the following advantages:

1. The vitamines are completely extracted from the cod liver oil, the residual oil after extraction being therapeutically inactive.
2. The amount of oil to be saponified is reduced to one-tenth, thereby entailing less work and less expense.
3. It is the best way of securing a most highly concentrated substance containing practically all of the antirachitic and antixerophthalmic vitamines, concentrated from 5,000 to 15,000 times.

The highly concentrated vitamine preparation has the following advantages:

1. It provides a starting material for further chemical work directed to the actual isolation and identification of the vitamines present in cod liver oil.
2. It provides an effective and pleasant method of carrying out cod liver oil therapy in that it does away with the nauseating oil, thus making it particularly easy to administer to children. Instead of giving a child a tablespoonful of cod liver oil, the same results may be obtained by using from 1 to 3 milligrams of the vitamine concentrate.

We claim:

1. Process of concentrating the vitamine content of a vitamine-containing material which comprises extracting the material with an organic acid and separating the resulting extract from the organic acid.
2. Process of concentrating the vitamine content of a vitamine-containing material which comprises extracting the material with glacial acetic acid and separating the resulting extract from the acetic acid.
3. Process of concentrating the vitamine content of cod liver oil, which comprises extracting the oil with an organic acid and separating the resulting extract from the organic acid.
4. Process of concentrating the vitamine content of cod liver oil, which comprises extracting the oil with glacial acetic acid and separating the resulting extract from the acetic acid.
5. Process of concentrating the vitamine content of a vitamine-containing material which comprises extracting the material with an organic acid, separating the resulting extract from organic acid, and saponifying the separated extract.

6. Process of concentrating the vitamine content of cod liver oil which comprises extracting the oil with glacial acetic acid, separating the resulting extract from acetic acid, and saponifying the separated extract.

7. Process of concentrating the vitamine content of a vitamine-containing material which comprises extracting the material with an organic acid, separating the resulting extract from organic acid, saponifying the separated extract and separating saponified from unsaponified material, and further concentrating the vitamine content of the unsaponified material by a saponin precipitation.

8. Process of concentrating the vitamine content of cod liver oil which comprises extracting the oil with glacial acetic acid, separating the resulting extract from acetic acid, saponifying the separated extract and separating saponified from unsaponified material, and further concentrating the vitamine content of the unsaponified material by a digitonin precipitation.

9. A vitamine-containing product derived from an organic acid extract of a material containing fat-soluble vitamines, said product containing in concentrated form antixerophthalmic and antirachitic vitamines in substantially the same ratio as said material.

10. A vitamine-containing product derived from a glacial acetic acid extract of a material containing fat-soluble vitamines, said product containing in concentrated form antixerophthalmic and antirachitic vitamines in substantially the same ratio as said material.

11. A vitamine-containing product derived from an organic acid extract of cod liver oil, said product containing in concentrated form antixerophthalmic and antirachitic vitamines in substantially the same ratio as cod liver oil.

12. A vitamine-containing product derived from a glacial acetic acid extract of cod liver oil, said product containing in concentrated form antixerophthalmic and antirachitic vitamines in substantially the same ratio as cod liver oil.

13. A vitamine-containing product derived from a fat-soluble vitamine containing material, said product being a pasty substance which is insoluble in water, soluble in the usual fat solvents, substantially free of said material and contains in concentrated form antixerophthalmic and antirachitic vitamines.

14. A vitamine-containing product derived from a fat-soluble vitamine containing material, said product being a pasty substance which is insoluble in water, soluble in the usual fat solvents, substantially free of said material and contains in concentrated form antixerophthalmic and antirachitic vitamines in substantially the same ratio as said material.

In testimony whereof, we affix our signatures.

CASIMIR FUNK.
HARRY E. DUBIN.

with an organic acid, separating the resulting extract from organic acid, and saponifying the separated extract.

6. Process of concentrating the vitamine content of cod liver oil which comprises extracting the oil with glacial acetic acid, separating the resulting extract from acetic acid, and saponifying the separated extract.

7. Process of concentrating the vitamine content of a vitamine-containing material which comprises extracting the material with an organic acid, separating the resulting extract from organic acid, saponifying the separated extract and separating saponified from unsaponified material, and further concentrating the vitamine content of the unsaponified material by a saponin precipitation.

8. Process of concentrating the vitamine content of cod liver oil which comprises extracting the oil with glacial acetic acid, separating the resulting extract from acetic acid, saponifying the separated extract and separating saponified from unsaponified material, and further concentrating the vitamine content of the unsaponified material by a digitonin precipitation.

9. A vitamine-containing product derived from an organic acid extract of a material containing fat-soluble vitamines, said product containing in concentrated form antixerophthalmic and antirachitic vitamines in substantially the same ratio as said material.

10. A vitamine-containing product derived from a glacial acetic acid extract of a material containing fat-soluble vitamines, said product containing in concentrated form antixerophthalmic and antirachitic vitamines in substantially the same ratio as said material.

11. A vitamine-containing product derived from an organic acid extract of cod liver oil, said product containing in concentrated form antixerophthalmic and antirachitic vitamines in substantially the same ratio as cod liver oil.

12. A vitamine-containing product derived from a glacial acetic acid extract of cod liver oil, said product containing in concentrated form antixerophthalmic and antirachitic vitamines in substantially the same ratio as cod liver oil.

13. A vitamine-containing product derived from a fat-soluble vitamine containing material, said product being a pasty substance which is insoluble in water, soluble in the usual fat solvents, substantially free of said material and contains in concentrated form antixerophthalmic and antirachitic vitamines.

14. A vitamine-containing product derived from a fat-soluble vitamine containing material, said product being a pasty substance which is insoluble in water, soluble in the usual fat solvents, substantially free of said material and contains in concentrated form antixerophthalmic and antirachitic vitamines in substantially the same ratio as said material.

In testimony whereof, we affix our signatures.

CASIMIR FUNK.
HARRY E. DUBIN.

CERTIFICATE OF CORRECTION.

Patent No. 1,629,074.      Granted May 17, 1927, to

CASIMIR FUNK ET AL.

It is hereby certified that error appears in the above numbered patent requiring correction as follows: In the grant and in the heading to the printed specification, title of invention, for the word "Antixerophilic" read "Antixerophthalmic"; and that the said Letters Patent should be read with this correction therein that the same may conform to the record of the case in the Patent Office.

Signed and sealed this 12th day of July, A. D. 1927.

Seal.

M. J. Moore,
Acting Commissioner of Patents.

CERTIFICATE OF CORRECTION.

Patent No. 1,629,074.                                          Granted May 17, 1927, to

CASIMIR FUNK ET AL.

It is hereby certified that error appears in the above numbered patent requiring correction as follows: In the grant and in the heading to the printed specification, title of invention, for the word "Antixerophilic" read "Antixerophthalmic"; and that the said Letters Patent should be read with this correction therein that the same may conform to the record of the case in the Patent Office.

Signed and sealed this 12th day of July, A. D. 1927.

Seal.

M. J. Moore,
Acting Commissioner of Patents.